United States Patent
Xu et al.

(10) Patent No.: US 12,218,957 B2
(45) Date of Patent: Feb. 4, 2025

(54) VOLUMETRIC CLUSTERING ON LARGE-SCALE DNS DATA

(71) Applicant: International Business Machines Corporation, Armonk, NY (US)

(72) Inventors: Pengxiang Xu, Huntington Beach, CA (US); Vaisakhi Mishra, White Plains, NY (US); Annamaria Balazs, Austin, TX (US); Cheng-Ta Lee, Chamblee, GA (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 17/655,604

(22) Filed: Mar. 21, 2022

(65) Prior Publication Data
US 2023/0300151 A1    Sep. 21, 2023

(51) Int. Cl.
*H04L 9/40* (2022.01)
*G06N 5/022* (2023.01)

(52) U.S. Cl.
CPC ......... *H04L 63/1416* (2013.01); *G06N 5/022* (2013.01)

(58) Field of Classification Search
CPC ............. H04L 63/1425; H04L 63/1441; H04L 63/1416; H04L 63/1408; H04L 63/14; H04L 63/1458; G06N 20/00
See application file for complete search history.

(56) References Cited

U.S. PATENT DOCUMENTS

| | | | |
|---|---|---|---|
| 8,424,091 B1 | 4/2013 | Su | |
| 9,386,028 B2 | 7/2016 | Altman | |
| 9,560,063 B2 | 1/2017 | Choi | |
| 10,237,283 B2 | 3/2019 | Zhang | |
| 10,574,681 B2 | 2/2020 | Meshi | |
| 10,692,004 B1* | 6/2020 | Segev | G06Q 50/01 |
| 2011/0179492 A1* | 7/2011 | Markopoulou | G06F 21/552 |
| | | | 702/181 |
| 2016/0065534 A1* | 3/2016 | Liu | G06F 16/951 |
| | | | 707/728 |
| 2016/0294859 A1 | 10/2016 | Choi et al. | |

(Continued)

OTHER PUBLICATIONS

"K-shape : Efficient and Accurate Clustering of Time Series," Paparrizos, John, et al. (Year: 2015).*

(Continued)

*Primary Examiner* — Tae K Kim
(74) *Attorney, Agent, or Firm* — Stephen R. Yoder (57) ABSTRACT

In an approach, a processor receives a set of normal domains, a set of suspicious domains, and a set of malicious domains; labels each domain of the set of normal domains as normal producing a labelled set of normal domains and each domain of the set of suspicious domains and the set of malicious domains as malicious producing a labelled set of malicious domains; samples a preset percentage of the labelled set of normal domains producing a sampled set of normal domains; aggregates the sampled set of normal domains and the labelled set of malicious domains producing a set of aggregated domains; filters the set of aggregated domains using hit size, inter-arrival-time, and univariate volumetric filters producing a set of filtered domains; and determines a cluster of a set of clusters to which each of the set of filtered domains is to be assigned using a trained K-shape model.

20 Claims, 5 Drawing Sheets

(56) References Cited

U.S. PATENT DOCUMENTS

| | | | |
|---|---|---|---|
| 2018/0041521 A1 | 2/2018 | Zhang et al. | |
| 2018/0069883 A1 | 3/2018 | Meshi et al. | |
| 2018/0124020 A1* | 5/2018 | Rodriguez | H04L 63/1425 |
| 2018/0351972 A1* | 12/2018 | Yu | H04L 63/1416 |
| 2019/0132344 A1* | 5/2019 | Lem | G06N 20/00 |
| 2020/0112487 A1* | 4/2020 | Inamdar | H04L 43/08 |
| 2020/0341966 A1* | 10/2020 | Stoecklin | G06F 16/23 |
| 2021/0248235 A1* | 8/2021 | Lee | G06N 3/045 |
| 2022/0147815 A1* | 5/2022 | Conwell | G06N 3/045 |
| 2022/0150275 A1* | 5/2022 | McNee | H04L 63/1441 |
| 2022/0237468 A1* | 7/2022 | Fang | H04L 63/1408 |
| 2022/0245227 A1* | 8/2022 | Dorn | G06F 18/2193 |
| 2022/0245461 A1* | 8/2022 | Sern | G06F 21/566 |
| 2022/0319304 A1* | 10/2022 | Menzel | G08B 27/005 |
| 2022/0377107 A1* | 11/2022 | Lee | H04L 61/4511 |
| 2023/0118679 A1* | 4/2023 | Mayer | H04L 63/1433 |
| | | | 707/706 |
| 2023/0259794 A1* | 8/2023 | Gusat | G06N 5/045 |
| | | | 706/46 |

OTHER PUBLICATIONS

"Proactively detecting crafted domains using active DNS measurements," Hendriks, Calvin (Year: 2020).*

"An Analysis Method for Time-Base Features of Malicious Domains Based on Time Series Clustering," Yan, Gezhi, et al., WISA 2023, LNCS 14094, pp. 347-358. (Year: 2023).*

"Detecting Malicious DNS over HTTPS Traffic in Domain Name System using Machine Learning Classifiers," Banad, Yaser, et al., Journal of Computer Sciences and Applications, 2020, vol. 8, No. 2, pp. 46-55. (Year: 2020).*

Haider et al., "Data driven battery anomaly detection based on shape based clustering for the data centers class", ScienceDirect, Journal of Energy Storage, vol. 29, Jun. 2020, 10 Pages.

Zhauniarovich et al., "A Survey on Malicious Domains Detection through DNS Data Analysis", ACM Computing Surveys (CSUR) 51, vol. 1, No. 1, Article 1, May 2018, 35 Pages.

* cited by examiner

VOLUMETRIC CLUSTERING ON LARGE-SCALE DNS DATA

BACKGROUND OF THE INVENTION

The present invention relates generally to the field of data processing, and more particularly to volumetric clustering of large-scale Domain Name System (DNS) data.

Time series analysis is a specific way of analyzing a sequence of data points collected over an interval of time. In time series analysis, analysts record data points at consistent intervals over a set period of time rather than just recording the data points intermittently or randomly. This type of analysis can show how variables change over time, i.e., the time variable shows how the data adjusts over the course of the data points as well as the final results. It provides an additional source of information and a set order of dependencies between the data. Time series analysis typically requires a large number of data points to ensure consistency and reliability. An extensive data set ensures you have a representative sample size and that analysis can cut through noisy data. It also ensures that any trends or patterns discovered are not outliers and can account for seasonal variance. Additionally, time series data can be used for forecasting—predicting future data based on historical data.

Time series analysis is a common analysis in cybersecurity used to analyze the historical context to identify anomalies. Clustering of time series data is a common approach for peer grouping with entities in the same group sharing a similar data characteristic. For example, users in the same group share a similar behavior on the Internet.

SUMMARY

Aspects of an embodiment of the present invention disclose a method, computer program product, and computer system volumetric clustering of large-scale Domain Name System (DNS) data. During a scoring phase and following a training phase, a processor receives a first set of domains, wherein the first set of domains comprises a set of normal domains, a set of suspicious domains, and a set of malicious domains. A processor labels each domain of the set of normal domains as normal to produce a labelled set of normal domains and each domain of the set of suspicious domains and the set of malicious domains as malicious to produce a labelled set of malicious domains. A processor samples a preset percentage of the labelled set of normal domains to produce a sampled set of normal domains. A processor aggregates the sampled set of normal domains and the labelled set of malicious domains based on a number of hits for each domain to produce a first set of aggregated domains. A processor filters the first set of aggregated domains using a hit size filter, an inter-arrival-time filter, and a univariate volumetric filter to produce a first set of filtered domains. A processor determines a cluster of a set of clusters to which each of the first set of filtered domains is to be assigned using a trained K-shape model.

DETAILED DESCRIPTION

Embodiments of the present invention recognize that time-series analysis is a common analysis in cybersecurity used to analyze the historical context to identify anomalies. Clustering of time-series data is a common approach for peer grouping with entities in the same group sharing a similar data characteristic. For example, users in the same group share a similar behavior on the Internet. Besides identifying the anomalies from a single domain, a group of domains needs to be looked at to understand the hidden relationships to help identify missing malicious domains. For example, knowing all the domains used in the same cyberattack campaign cannot be determined by looking at a single domain. Thus, embodiments of the present invention recognize the need to identify the hidden relationships so that new malicious domains can be more easily identified.

Embodiments of the present invention accomplish this by clustering domains based on their query patterns (or hit pattern, i.e., number of hits in a time series) to identify relevancy between domains. It has been proven that domains registered by the same threat actor or utilized in the same cyberattack campaign have similar patterns. Embodiments of the present invention utilize time series data from DNS providers that translate domain names to Internet Protocol (IP) addresses. Embodiments recognize that there are more than 1 billion active domains on the Internet and data cardinality is too large to make the analysis pipeline scalable. Since less than 1% of domains on the Internet are malicious, clustering only malicious domains makes sense. However, if only the known-bad domains are processed, there is no chance to identify new malicious domains. There is no existing analysis pipeline that can process large-scale real-world DNS data.

Embodiments of the present invention provide a system and method for volumetric clustering of large-scale DNS data. Embodiments of the present invention cluster domains only using known-bad domains at first to identify actionable malicious domain clusters, and if a cluster contains mostly malicious domains (e.g., >95%) then it is an actionable cluster. The actionable clusters are used to point out the hidden relationships between the domains in the same cluster. Embodiments of the present invention enable looking up unknown domains to see which cluster they fit. If an unknown domain matches an actionable cluster, then the unknown domain is likely to be malicious too and can be further investigated by a security analyst.

Embodiments of the present invention reduce the complexity of processing large-scale DNS data because less than 1% of domains are malicious. By utilizing the malicious clusters, embodiments of the present invention achieve two goals: (1) identify the hidden relationships, e.g., all domains in the same cluster are related and/or domains in the same cluster are utilized by the same threat actor/campaign/malware family/botnet, and (2) identify new malicious domains, e.g., if an unknown domain with a query (hit) pattern that matches an actionable malicious cluster, then the unknown domain is a malicious domain.

Embodiments of the present invention help identify more malicious domains in a smarter and more efficient manner that then can be investigated by security analysts. Embodiments of the present invention enable analysis of the clusters and graphs output by the program to generate insights. Graphs output by the program can include a graph of the number of domains per cluster that shows a percent of malicious domains in each cluster and graphs for each cluster that show the hit pattern over a period of time for each domain in the respective cluster.

Implementation of embodiments of the invention may take a variety of forms, and exemplary implementation details are discussed subsequently with reference to the Figures.

Figure 1:
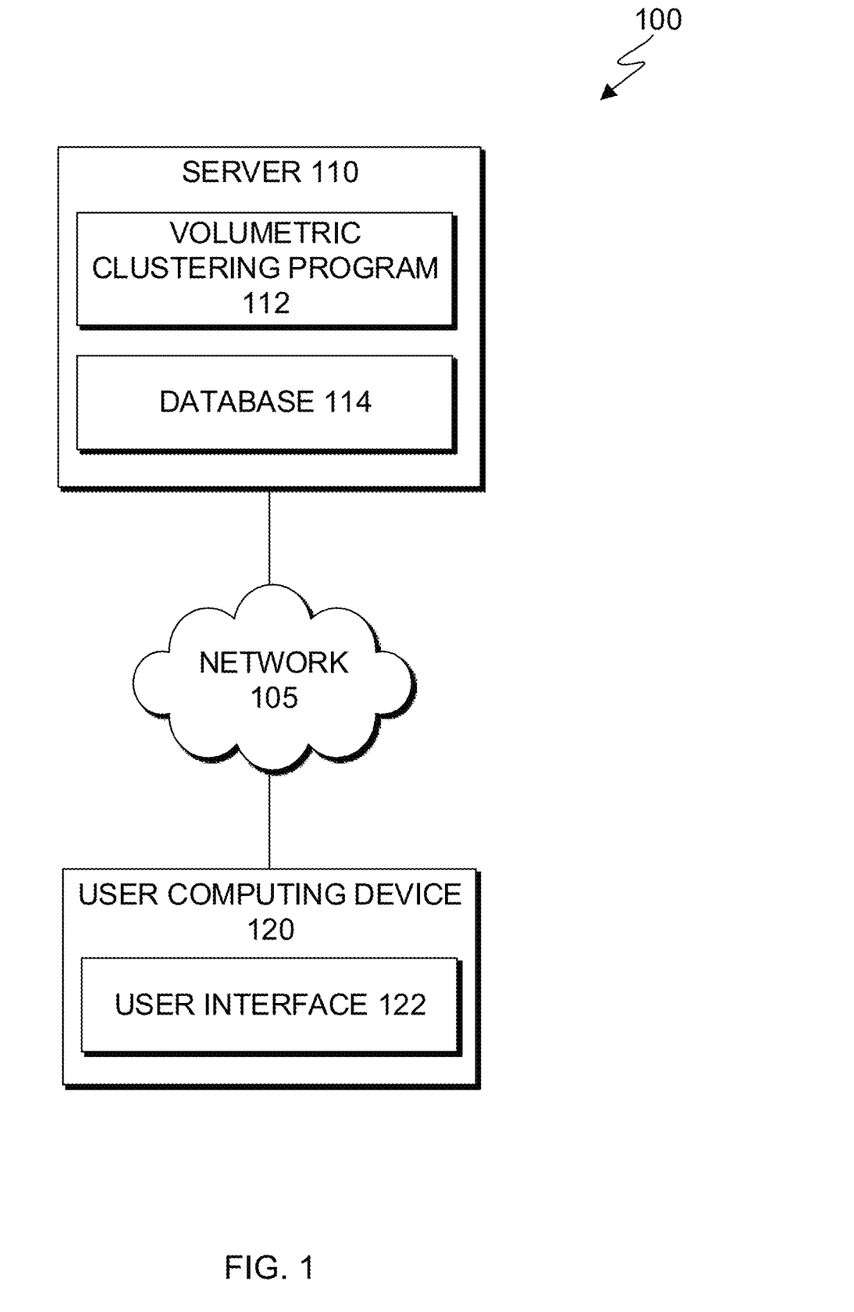
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110 and user computing device 120, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, user computing device 120, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with user computing device 120 and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes volumetric clustering program 112 and database 114. Server 110 may include internal and external hardware components, as depicted and described in further detail with respect to FIG. 5.

Volumetric clustering program 112 operates to perform volumetric clustering of large-scale DNS data. In the depicted embodiment, volumetric clustering program 112 is a standalone program. In another embodiment, volumetric clustering program 112 may be integrated into another software product, e.g., data analytics software package. In an embodiment, a training component of volumetric clustering program 112 trains a K-shape model using known malicious domains from a labeled, aggregated, and filtered first set of domain data to cluster domains based on their hit pattern. The training component of volumetric clustering program 112 is depicted and described in further detail with respect to FIG. 2. In an embodiment, a scoring component of volumetric clustering program 112 determines a cluster to which each domain of a labeled, aggregated, and filtered second set of domain data should be assigned using the trained K-shape model. The scoring component of volumetric clustering program 112 is depicted and described in further detail with respect to FIG. 3.

Database 114 operates as a repository for data received, used, and/or output by volumetric clustering program 112. Data received, used, and/or generated may include, but is not limited to, DNS time series data received over a preset time period (e.g., two weeks of 1 minute time series data) that includes three files: normal domains, suspicious domains, and malicious domains; a K-shape model data, and any other data received, used, and/or output by volumetric clustering program 112. Database 114 can be implemented with any type of storage device capable of storing data and configuration files that can be accessed and utilized by server 110, such as a hard disk drive, a database server, or a flash memory. In an embodiment, database 114 is accessed by volumetric clustering program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that volumetric clustering program 112 has access to database 114.

User computing device 120 operates as a computing device associated with a user on which the user can interact with volumetric clustering program 112 through an application user interface. In the depicted embodiment, user computing device 120 includes an instance of user interface 122. In an embodiment, user computing device 120 can be a laptop computer, a tablet computer, a smart phone, a smart watch, an e-reader, smart glasses, wearable computer, or any programmable electronic device capable of communicating with various components and devices within distributed data processing environment 100, via network 105. In general, user computing device 120 represents one or more programmable electronic devices or combination of programmable electronic devices capable of executing machine readable program instructions and communicating with other computing devices (not shown) within distributed data processing environment 100 via a network, such as network 105.

User interface 122 provides an interface between volumetric clustering program 112 on server 110 and a user of user computing device 120. In one embodiment, user interface 122 is a mobile application software. Mobile application software, or an "app," is a computer program designed to run on smart phones, tablet computers, and other mobile computing devices. In one embodiment, user interface 132 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 122 enables a user of user computing device 130 to set a threshold for when a cluster is deemed actionable (e.g., >95% malicious domains in a cluster) and view and/or manage output of volumetric clustering program 112.

Figure 2:
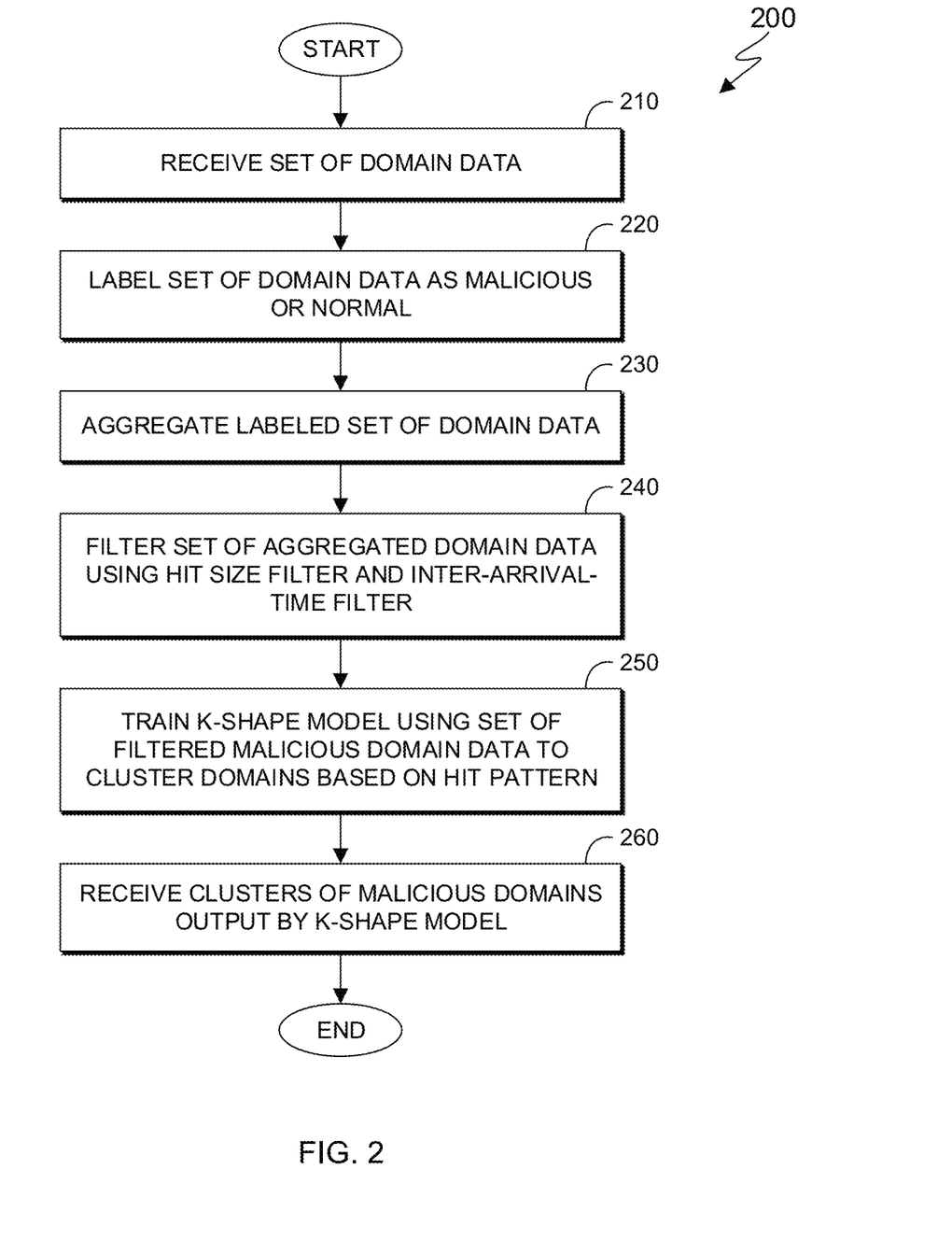
FIG. 2 is a flowchart depicting operational steps of a training component of volumetric clustering program, for training a K-shape model to cluster large-scale (Domain Name System) DNS data, running on a server of the distributed data processing environment of FIG. 1 in accordance with an embodiment of the present invention.

FIG. 2 is a flowchart 200 depicting operational steps of a training component of volumetric clustering program 112, for training a K-shape model to cluster large-scale DNS data, running on server 110 of distributed data processing environment 100 of FIG. 1 in accordance with an embodiment of the present invention. It should be appreciated that the process depicted in FIG. 2 illustrates one possible iteration of the training component of volumetric clustering program 112.

In step 210, volumetric clustering program 112 receives a set of domain data. In an embodiment, volumetric clustering program 112 receives a set of DNS data (hereinafter referred to as "domain data" or "domains"), in which the set includes a preset time period of domain data, e.g., 1 week, 2 weeks, etc. of domain data, which could include hundreds of millions of records). The preset time period can be preset by volumetric clustering program 112 and then modified by a user, e.g., a user of user computing device 120. In an embodiment, volumetric clustering program 112 receives three types of files for the set of domain data—a file of suspicious domains, a file of malicious domains, and a file of normal domains. In some embodiments, volumetric clustering program 112 receives two types of files for the set of domain data—a file of suspicious domains and malicious domains and a file of normal domains. These file type designations for domains in the first set are given by, e.g., a security analyst. In an embodiment, volumetric clustering program 112 receives metadata associated with each domain of the set of domain data. Metadata for each domain includes, but is not limited to, a domain name, a timestamp, and a number of hits.

In step 220, volumetric clustering program 112 labels the set of domain data. In an embodiment, volumetric clustering program 112 labels each domain data of the set of domain data based on the type of file of a respective domain. In an embodiment, volumetric clustering program 112 labels the suspicious domains and malicious domains as malicious producing a labelled set of malicious domains. In an embodiment, volumetric clustering program 112 labels the normal domains as normal producing a labelled set of normal domains. In an embodiment, volumetric clustering program 112 produces a labeled set of domain data from the labeling of each domain of the set of domain data based on the type of file of each domain. In some embodiments, volumetric clustering program 112 removes the labelled set of normal domains from further processing in this training component.

In step 230, volumetric clustering program 112 aggregates the labeled set of domain data. In an embodiment, volumetric clustering program 112 aggregates the labeled set of domain data based on a number of hits for each domain. In an embodiment, volumetric clustering program 112 aggregates the labeled set of domain data to organize the large amount of data so that there is a manageable number of data points. In an embodiment, volumetric clustering program 112 aggregates the labeled set of domain data from data at every, e.g., 1 min to every x-min. In an embodiment, volumetric clustering program 112 produces a set of aggregated domain data from aggregating the labeled set of domain data based on at least one of a timestamp and a number of hits for each domain.

In step 240, volumetric clustering program 112 filters the set of aggregated domain data. In an embodiment in which the normal domains have not yet been removed, volumetric clustering program 112 filters out the domains labeled as normal from the set of aggregated domain data with only the domains labeled as malicious remaining. In an embodiment, volumetric clustering program 112 filters the remaining domains labeled as malicious using, in parallel or sequentially (with either filter being first), a hit size filter and an inter-arrival-time filter. In an embodiment, volumetric clustering program 112 filters the remaining domains labeled as malicious using a hit size filter that filters out the domains with low hit activities (i.e., a low number of hits) based on a preset threshold (e.g., median hits for a given period of time) since low activity domains may not present a clear hit pattern. In other words, the hit size filter filters out domains with a number of hits below a preset hit number threshold. In an embodiment, volumetric clustering program 112 filters the remaining domains labeled as malicious using an inter-arrival-time filter that filters the domains based on their inter-arrival-time (IAT), which is the time between two consecutive hits, with a preset threshold in place (e.g., the median IAT of the dataset) to filter out domains with IATs longer than the preset threshold. In an embodiment, volumetric clustering program 112 produces a set of filtered malicious domain data that is the domains labelled as malicious remaining after the hit size filter and IAT filter have been applied.

In step 250, volumetric clustering program 112 trains a K-shape model using the set of filtered malicious domain data to cluster domains based on a domain's hit pattern. In an embodiment, volumetric clustering program 112 trains a K-shape model by analyzing a hit pattern, which is in the form of a line for each domain on a graph with hits versus time, for each domain of the set of filtered malicious domain data. In an embodiment, volumetric clustering program 112 groups similar hit patterns (i.e., line patterns that have an overall similar shape) together using K-shape modeling and forms clusters.

In step 260, volumetric clustering program 112 receives a set of clusters of malicious domains output by the K-shape model. In an embodiment, volumetric clustering program 112 receives clusters of malicious domains output by the K-shape model. In an embodiment, volumetric clustering program 112 outputs the clusters of malicious domains, e.g., to a user of user computing device 120, as a graph of data points designated in some way in a specific cluster. In an embodiment, volumetric clustering program 112 stores the clusters of malicious domains, e.g., in database 114.

Figure 3:
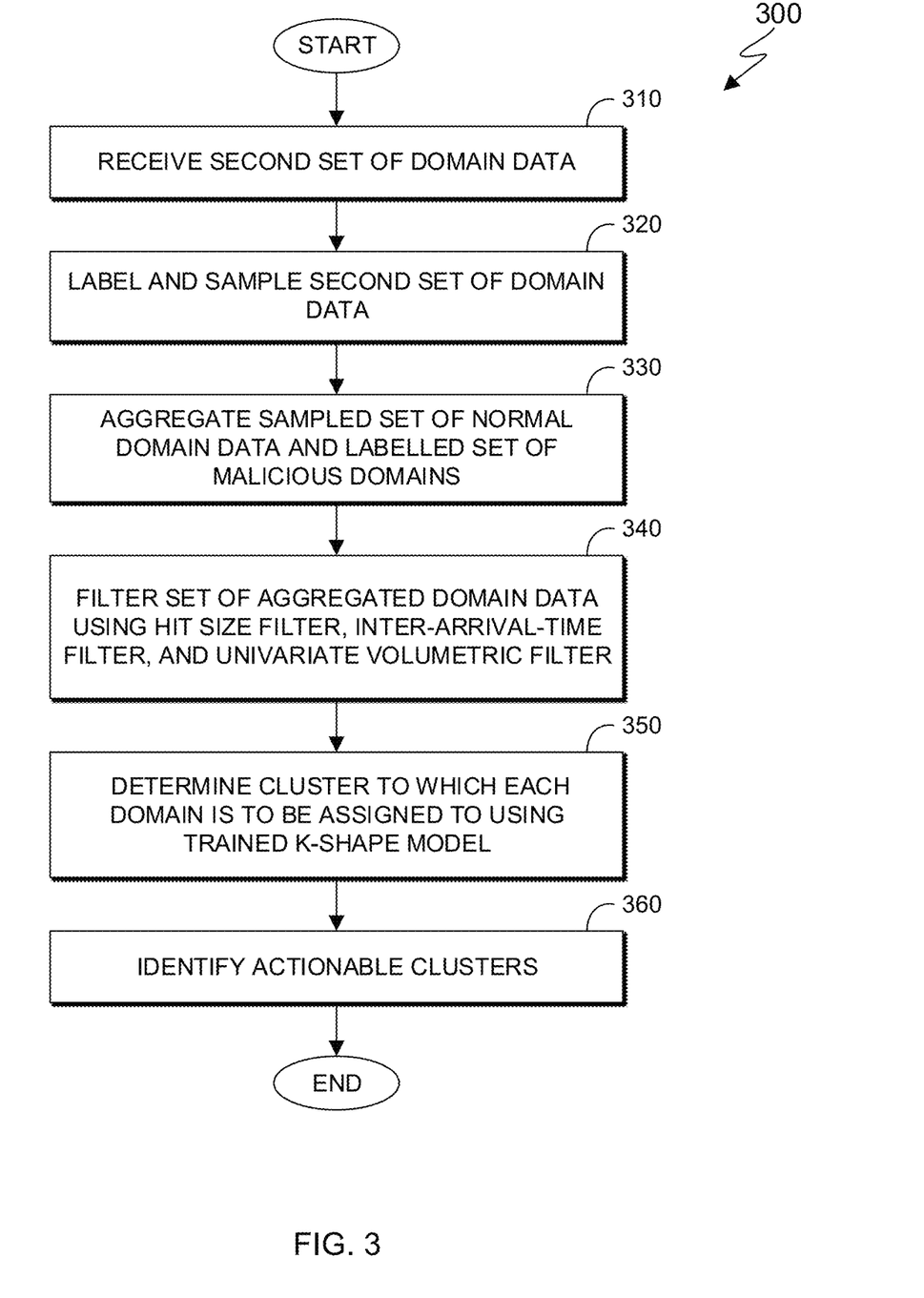
FIG. 3 is a flowchart depicting operational steps of a scoring component of volumetric clustering program, for volumetric clustering of large-scale DNS data, running on a server of the distributed data processing environment of FIG. 1 in accordance with an embodiment of the present invention.

FIG. 3 is a flowchart 300 depicting operational steps of a scoring component of volumetric clustering program 112, for volumetric clustering of large-scale DNS data, running on server 110 of distributed data processing environment 100 of FIG. 1 in accordance with an embodiment of the present invention. It should be appreciated that the process depicted in FIG. 3 illustrates one possible iteration of volumetric clustering program 112, which may be repeated for each set of DNS data received after training in complete.

In step 310, volumetric clustering program 112 receives another set of domain data. In an embodiment, volumetric clustering program 112 receives another (hereinafter referred to as "second") set of DNS data (hereinafter referred to as "domain data"), in which the set includes a preset time period of domain data, e.g., 1 week, 2 weeks, etc. of domain data, later in time (i.e., more current) from the set of domain data used in the training component, which could include another hundreds of millions of records). The preset time period can be preset by volumetric clustering program 112 and then modified by a user, e.g., a user of user computing device 120. In an embodiment, volumetric clustering program 112 receives three types of files for the second set of domain data—a file of suspicious domains, a file of malicious domains, and a file of normal domains. In some embodiments, volumetric clustering program 112 receives two types of files for the second set of domain data—a file of suspicious domains and malicious domains and a file of normal domains. These file type designations for domains in this set are given by or are as previously designated by, e.g., a security analyst. In an embodiment, volumetric clustering program 112 receives metadata associated with each domain of the second set of domain data. Metadata for each domain includes, but is not limited to, a domain name, a timestamp, and a number of hits.

In step 320, volumetric clustering program 112 labels and samples the second set of domain data. In an embodiment, volumetric clustering program 112 labels each domain data of the second set of domain data based on the type of file of a respective domain. In an embodiment, volumetric clustering program 112 labels the suspicious domains and malicious domains as malicious to produce a labelled set of malicious domains. In an embodiment, volumetric clustering program 112 labels the normal domains as normal to produce a labelled set of normal domains and samples a preset percentage, e.g., 10%, of the normal domains for further processing, to produce a sampled set of normal domains. In an embodiment, the preset percentage can be preset by a user, e.g., a user of user computing device 120.

In step 330, volumetric clustering program 112 aggregates the sampled set of normal domains and the labelled set of malicious domains. In an embodiment, volumetric clustering program 112 aggregates the sampled set of normal domains and the labelled set of malicious domains based on a number of hits for each domain. In an embodiment, volumetric clustering program 112 aggregates the labeled and sampled second set of domain data to organize the large amount of data so that there is a manageable number of data points producing a set of aggregated domain data from aggregating based on at least one of a timestamp and a number of hits for each domain.

In step 340, volumetric clustering program 112 filters the set of aggregated domain data. In an embodiment, volumetric clustering program 112 filters the set of aggregated domain data using a hit size filter, an inter-arrival-time filter, and a univariate volumetric filter. In some embodiments, the three filters are done in order of the hit size filter, then the inter-arrival-time filter, and then the univariate volumetric filter. In other embodiments, the hit size filter and the inter-arrival-time filter can be done in parallel or in reverse order with the univariate volumetric filter always being done last. In an embodiment, volumetric clustering program 112 filters the set of aggregated domain data using a hit size filter that filters out the domains with low hit activities (i.e., a low number of hits) based on a preset threshold (e.g., median hits for a given period of time) since low activity domains may not present a clear hit pattern. In other words, the hit size filter filters out domains with a number of hits below a preset hit number threshold. In an embodiment, volumetric clustering program 112 filters the set of aggregated domain data using an inter-arrival-time filter that filters the domains based on their inter-arrival-time (IAT), which is the time between two consecutive hits, with a preset threshold in place (e.g., the median IAT of the dataset) to filter out domains with IATs longer than the preset threshold. In an embodiment, volumetric clustering program 112 filters the set of aggregated domains using the hit size filter and the inter-arrival-time filter in sequence or consecutively to produce a set of semi-filtered domains.

In an embodiment, after completing the hit size filter and IAT filter, volumetric clustering program 112 filters the domains remaining after the first two filters (the set of semi-filtered domains) using a univariate volumetric filter (UVF) that determines the abnormality of a domain's hit time-series pattern and filters out domains deemed as normal domains (i.e., not abnormal as defined by a confidence interval). In other words, the UVF determines an abnormality of a hit time-series pattern for each domain and filters out domains that fall within a confidence interval for the hit time-series pattern. In an embodiment, the UVF updates a time-series model, e.g., an exponential smoothing state space model with Box-Cox transformation, ARMA errors, and Trend and Seasonal components (BATS), with hit time-series data of each domain remaining after the first two filters to predict the hits along with a confidence interval (i.e., upper and lower bounds of a hit pattern) for a future time step. At any timestamp in a future prediction period, a domain is considered suspicious (i.e., could be a malicious domain) when its actual hits are outside of the confidence interval and considered normal otherwise.

In an embodiment, volumetric clustering program 112 produces a set of filtered domain data that includes the domains remaining after the hit size filter, IAT filter, and the UVF filter have been applied to the set of aggregated domain data. This set of filtered domain data can be considered to include suspicious domains (i.e., potentially and likely to be malicious domains).

In step 350, volumetric clustering program 112 determines a cluster to which each domain (remaining after the filtering) should be assigned using the trained K-shape model. In an embodiment, volumetric clustering program 112 determines a cluster to which each domain of the set of filtered domain data should be assigned using the trained K-shape model to score a distance to the centroid of each cluster and whichever distance is shortest determines the cluster to which the respective domain is assigned. If volumetric clustering program 112 assigns a domain to an actionable cluster (as identified in step 360), then that domain can be deemed a malicious domain, in which domains deemed malicious by volumetric clustering program 112 should be further investigated by a security analyst.

In step 360, volumetric clustering program 112 identifies actionable clusters. Since this scoring process flow includes both originally malicious and normal domains from a second set of domain data, some domains (malicious or normal) behave abnormally as determined by the UVF, are scored using the trained K-shape model, and are assigned to a cluster. If the assigned cluster contains predominantly malicious domains (e.g., >95%), then the cluster is considered an actionable cluster. In an embodiment, volumetric clustering program 112 identifies a cluster as an actionable cluster if over a preset threshold of the domains in the cluster are malicious, e.g., greater than 95% of the domains in a cluster are malicious, in which the preset threshold can be preset by a user, e.g., a user of user computing device 120. Actionable clusters point out the hidden relationships between domains in a respective actionable cluster. If volumetric clustering program 112 assigns a domain to an actionable cluster, then that domain can be deemed a suspicious domain that requires an investigation by a security analyst for determining whether the domain should be deemed as malicious. In some embodiments, volumetric clustering program 112 outputs domains assigned to actionable clusters for further investigation by a security analyst, e.g., output through user interface 122 of user computing device 120.

Figure 4A:
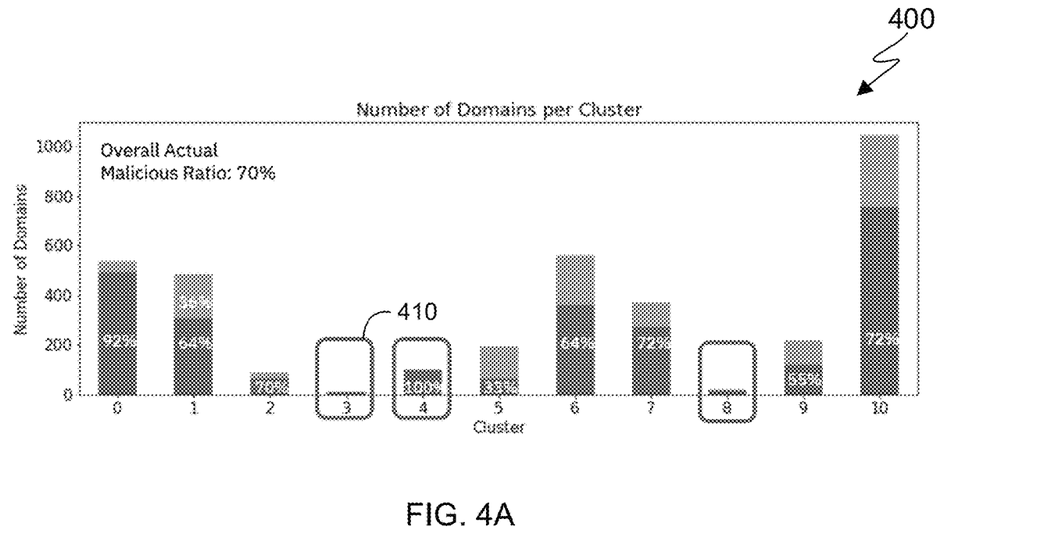
FIG. 4A depicts an example bar graph output by the volumetric clustering program, in accordance with an embodiment of the present invention.

FIG. 4A depicts an example bar graph 400 that can be created and output by volumetric clustering program 112 after all the filtered domains are assigned to a cluster using the trained K-shape model (step 350) The bar graph 400 shows the number of domains per cluster and what percentage of the domains in each cluster are labeled as malicious or normal. FIG. 4A includes three actionable clusters 410 as circled to be clusters 3, 4, and 8. Any unknown domains assigned to any of these actionable clusters can be deemed as a malicious domain.

Figure 4B:
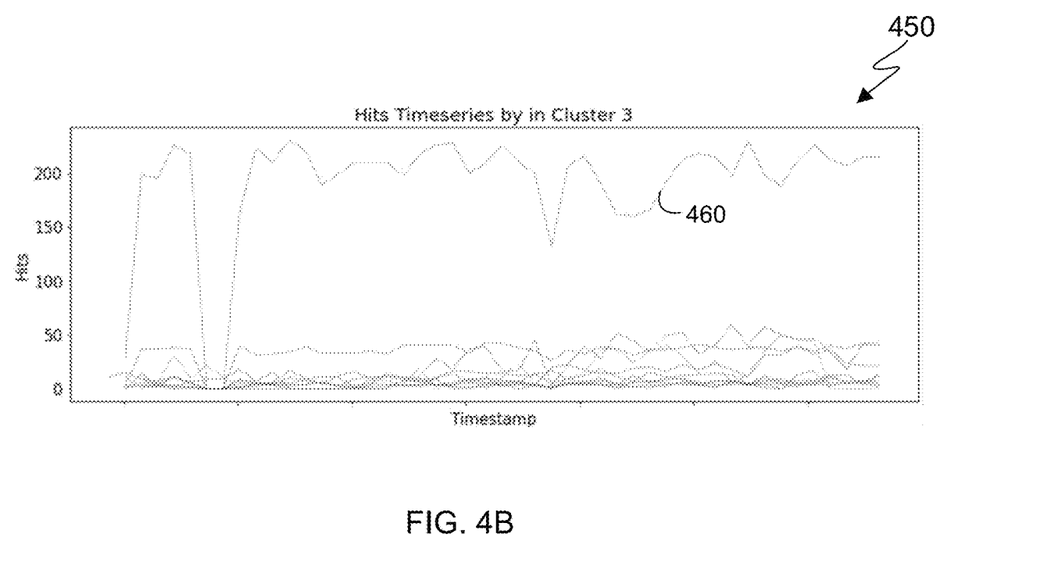
FIG. 4B depicts an example line graph output by the volumetric clustering program, in accordance with an embodiment of the present invention.

FIG. 4B depicts an example line graph 450 that can be created and output by volumetric clustering program 112 after all the filtered domains are assigned to a cluster using the trained K-shape model (step 350). The line graph 450 shows the hits timeseries for cluster 3 from FIG. 4A. In line graph 450, the hit pattern 460 for each domain in cluster 3 is depicted and shows how the hit patterns for the domains in cluster 3 are similar.

Figure 5:
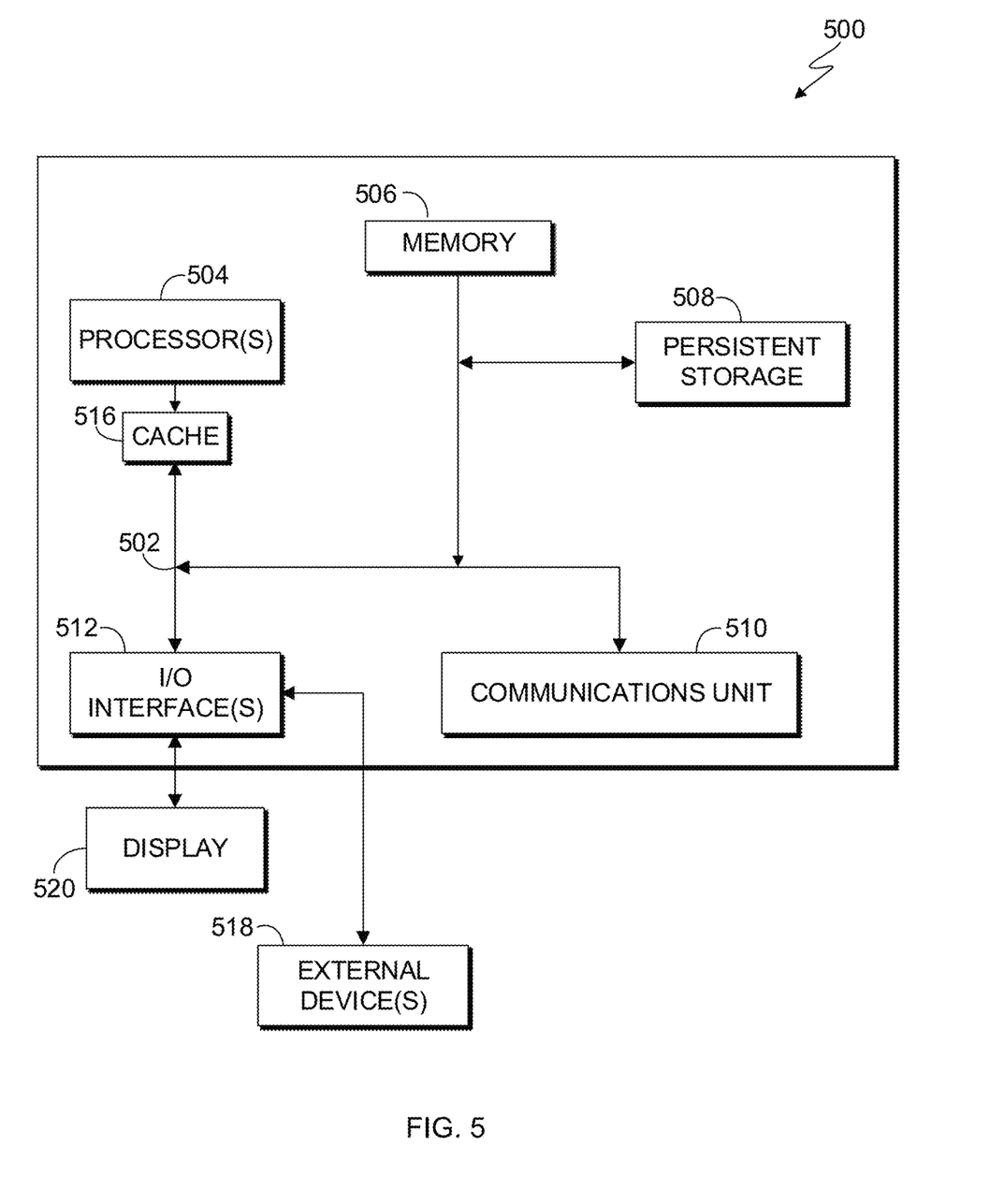
FIG. 5 depicts a block diagram of components of the server of the distributed data processing environment of FIG. 1, for running the volumetric clustering program, in accordance with an embodiment of the present invention.

FIG. 5 depicts a block diagram of components of computing device 500, suitable for server 110 running volumetric clustering program 112 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs may be downloaded to persistent storage 508 through communications unit 510.

I/O interface(s) 512 allows for input and output of data with other devices that may be connected to server 110. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a first set of domains, wherein the first set of domains comprises a set of normal domains, a set of suspicious domains, and a set of malicious domains;
   labelling, by the one or more processors, each domain of the set of normal domains as normal to produce a labelled set of normal domains and each domain of the set of suspicious domains and the set of malicious domains as malicious to produce a labelled set of malicious domains;
   sampling, by the one or more processors, a preset percentage of the labelled set of normal domains to produce a sampled set of normal domains;
   aggregating, by the one or more processors, the sampled set of normal domains and the labelled set of malicious domains based on a number of hits for each domain to produce a first set of aggregated domains;

filtering, by the one or more processors, the first set of aggregated domains using a hit size filter, an inter-arrival-time filter, and a univariate volumetric filter to produce a first set of filtered domains; and determining, by the one or more processors, a cluster of a set of clusters to which each of the first set of filtered domains is to be assigned using a trained K-shape model.

2. The computer-implemented method of claim 1, wherein the first set of domains comprises Domain Name System (DNS) data over a preset time period with metadata for each domain, wherein the metadata for each domain includes a domain name, a timestamp, and a number of hits.

3. The computer-implemented method of claim 1, wherein filtering the first set of aggregated domains using the hit size filter, the inter-arrival-time filter, and the univariate volumetric filter to produce the first set of filtered domains comprises:

filtering, by the one or more processors, the first set of aggregated domains using the hit size filter and the inter-arrival-time filter in sequence or consecutively to produce a set of semi-filtered domains; and filtering, by the one or more processors, the set of semi-filtered domains using the univariate volumetric filter to produce the first set of filtered domains.

4. The computer-implemented method of claim 1, wherein the hit size filter filters out domains with a number of hits below a preset hit number threshold.

5. The computer-implemented method of claim 1, wherein the inter-arrival-time filter filters out domains with inter-arrival-times longer than a preset inter-arrival-time threshold, wherein an inter-arrival-time is a time between two consecutive hits.

6. The computer-implemented method of claim 1, wherein the univariate volumetric filter determines an abnormality of a hit time-series pattern for each domain and filters out domains that fall within a confidence interval for the hit time-series pattern.

7. The computer-implemented method of claim 1, further comprising:

identifying, by the one or more processors, a respective cluster of the set of clusters as an actionable cluster when more than a preset threshold number of domains in the respective cluster are deemed malicious.

8. The computer-implemented method of claim 1, further comprising:

prior to receiving the first set of domains, training, by the one or more processors, the trained K-shape model by:

receiving, by the one or more processors, a second set of domains, wherein the second set of domains comprises a second set of normal domains, a second set of suspicious domains, and a second set of malicious domains;

labelling, by the one or more processors, each domain of the second set of suspicious domains and the second set of malicious domains as malicious to produce a set of labelled malicious domains;

aggregating, by the one or more processors, the set of labelled malicious domains based on a number of hits for each domain to produce a set of aggregated malicious domains;

filtering, by the one or more processors, the set of aggregated malicious domains using the hit size filter and the inter-arrival-time filter to produce a set of filtered malicious domains; and training, by the one or more processors, a K-shape model to group domains of the set of filtered malicious domains with similar hit patterns using K-shape modelling producing the trained K-shape model; and receiving, by the one or more processors, a set of clusters of malicious domains output by the trained K-shape model.

9. A computer program product comprising:

one or more computer readable storage media and program instructions collectively stored on the one or more computer readable storage media, the stored program instructions comprising:

program instructions to receive a first set of domains, wherein the first set of domains comprises a set of normal domains, a set of suspicious domains, and a set of malicious domains;

program instructions to label each domain of the set of normal domains as normal to produce a labelled set of normal domains and each domain of the set of suspicious domains and the set of malicious domains as malicious to produce a labelled set of malicious domains;

program instructions to sample a preset percentage of the labelled set of normal domains to produce a sampled set of normal domains;

program instructions to aggregate the sampled set of normal domains and the labelled set of malicious domains based on a number of hits for each domain to produce a first set of aggregated domains;

program instructions to filter the first set of aggregated domains using a hit size filter, an inter-arrival-time filter, and a univariate volumetric filter to produce a first set of filtered domains; and program instructions to determine a cluster of a set of clusters to which each of the first set of filtered domains is to be assigned using a trained K-shape model.

10. The computer program product of claim 9, wherein the first set of domains comprises Domain Name System (DNS) data over a preset time period with metadata for each domain, wherein the metadata for each domain includes a domain name, a timestamp, and a number of hits.

11. The computer program product of claim 9, wherein the program instructions to filter the first set of aggregated domains using the hit size filter, the inter-arrival-time filter, and the univariate volumetric filter to produce the first set of filtered domains comprise:

program instructions to filter the first set of aggregated domains using the hit size filter and the inter-arrival-time filter in sequence or consecutively to produce a set of semi-filtered domains; and program instructions to filter the set of semi-filtered domains using the univariate volumetric filter to produce the first set of filtered domains.

12. The computer program product of claim 9, wherein the hit size filter filters out domains with a number of hits below a preset hit number threshold.

13. The computer program product of claim 9, wherein the inter-arrival-time filter filters out domains with inter-arrival-times longer than a preset inter-arrival-time threshold, wherein an inter-arrival-time is a time between two consecutive hits.

14. The computer program product of claim 9, wherein the univariate volumetric filter determines an abnormality a hit time-series pattern for each domain and filters out domains that fall within a confidence interval for the hit time-series pattern.

15. The computer program product of claim 9, further comprising:

program instructions to identify a respective cluster of the set of clusters as an actionable cluster when more than a preset threshold number of domains in the respective cluster are deemed malicious.

16. The computer program product of claim 9, further comprising:
prior to receiving the first set of domains, program instructions to train the trained K-shape model by:
receiving a second set of domains, wherein the second set of domains comprises a second set of normal domains, a second set of suspicious domains, and a second set of malicious domains;
labelling each domain of the second set of suspicious domains and the second set of malicious domains as malicious to produce a set of labelled malicious domains;
aggregating the set of labelled malicious domains based on a number of hits for each domain to produce a set of aggregated malicious domains;
filtering the set of aggregated malicious domains using the hit size filter and the inter-arrival-time filter to produce a set of filtered malicious domains; and
training a K-shape model to group domains of the set of filtered malicious domains with similar hit patterns using K-shape modelling producing the trained K-shape model; and
program instructions to receive a set of clusters of malicious domains output by the trained K-shape model.

17. A computer system comprising:
one or more computer processors;
one or more computer readable storage media;
program instructions collectively stored on the one or more computer readable storage media for execution by at least one of the one or more computer processors, the stored program instructions comprising:
program instructions to receive a first set of domains, wherein the first set of domains comprises a set of normal domains, a set of suspicious domains, and a set of malicious domains;
program instructions to label each domain of the set of normal domains as normal to produce a labelled set of normal domains and each domain of the set of suspicious domains and the set of malicious domains as malicious to produce a labelled set of malicious domains;
program instructions to sample a preset percentage of the labelled set of normal domains to produce a sampled set of normal domains;
program instructions to aggregate the sampled set of normal domains and the labelled set of malicious domains based on a number of hits for each domain to produce a first set of aggregated domains;
program instructions to filter the first set of aggregated domains using a hit size filter, an inter-arrival-time filter, and a univariate volumetric filter to produce a first set of filtered domains; and
program instructions to determine a cluster of a set of clusters to which each of the first set of filtered domains is to be assigned using a trained K-shape model.

18. The computer system of claim 17, wherein the first set of domains comprises Domain Name System (DNS) data over a preset time period with metadata for each domain, wherein the metadata for each domain includes a domain name, a timestamp, and a number of hits.

19. The computer system of claim 17, wherein the program instructions to filter the first set of aggregated domains using the hit size filter, the inter-arrival-time filter, and the univariate volumetric filter to produce the first set of filtered domains comprise:
program instructions to filter the first set of aggregated domains using the hit size filter and the inter-arrival-time filter in sequence or consecutively to produce a set of semi-filtered domains; and
program instructions to filter the set of semi-filtered domains using the univariate volumetric filter to produce the first set of filtered domains.

20. The computer system of claim 17, further comprising:
program instructions to identify a respective cluster of the set of clusters as an actionable cluster when more than a preset threshold number of domains in the respective cluster are deemed malicious.

* * * * *